United States Patent [19]

Ogawa

[11] Patent Number: 5,092,991

[45] Date of Patent: Mar. 3, 1992

[54] FILTERING DEVICE

[75] Inventor: Yonekichi Ogawa, Tokyo, Japan

[73] Assignee: Suisaku Kabushiki Kaisha, Tokyo, Japan

[21] Appl. No.: 707,223

[22] Filed: May 24, 1991

Related U.S. Application Data

[63] Continuation of Ser. No. 535,221, Jun. 8, 1990, abandoned, which is a continuation of Ser. No. 131,295, Dec. 7, 1987, abandoned, which is a continuation of Ser. No. 897,888, Aug. 19, 1986, abandoned.

[30] Foreign Application Priority Data

Aug. 20, 1985 [JP]  Japan .................................. 60-182805
Sep. 9, 1985 [JP]  Japan .................................. 60-198766

[51] Int. Cl.$^5$ .............................................. E04H 4/00
[52] U.S. Cl. .................................... 210/169; 210/232; 210/416.2; 119/5
[58] Field of Search ................. 210/169, 232, 416.2; 119/5

[56] References Cited

U.S. PATENT DOCUMENTS

| | | | |
|---|---|---|---|
| 3,119,774 | 6/1960 | Arak | 210/169 |
| 3,294,239 | 3/1963 | Dayes | 119/5 |
| 3,717,253 | 2/1973 | Lovitz | 210/169 |
| 3,770,128 | 11/1973 | Kast | 210/169 |
| 3,785,494 | 1/1974 | Sama | 210/169 |
| 3,850,806 | 11/1974 | Cohen | 210/169 |
| 3,867,292 | 2/1975 | Cornell | 210/169 |
| 3,927,643 | 12/1975 | Ritzow et al. | 119/5 |
| 4,186,093 | 1/1980 | Willinger | 210/169 |
| 4,552,657 | 11/1985 | Ogawa | 210/169 |
| 4,556,485 | 12/1985 | Ogawa | 210/169 |
| 4,620,924 | 11/1986 | Goldman et al. | 210/169 |

FOREIGN PATENT DOCUMENTS

| | | |
|---|---|---|
| 1911092 | 7/1970 | Fed. Rep. of Germany . |
| 1611095 | 1/1971 | Fed. Rep. of Germany . |
| 3136243 | 3/1983 | Fed. Rep. of Germany . |
| 2027491 | 9/1970 | France . |
| 1317824 | 5/1973 | United Kingdom . |

*Primary Examiner*—W. Gary Jones
*Assistant Examiner*—Matthew O. Savage
*Attorney, Agent, or Firm*—Armstrong, Nikaido, Marmelstein, Kubovcik & Murray

[57] ABSTRACT

A filtering device which is disclosed herein comprises a rising pipe bascially shaped into a cylinder having a drain port at its upper end and placed within a box-like basin to vertically extend, and a porous air injecting member contained within the rising pipe at its lower portion in a connected relationship to a pressurized air source to develop and upward flow of water within the rising pipe. In the filtering device, the rising pipe is formed of an elastic material to have a back wall comprised of a pair of mounting portions forming an angle slightly larger than that of the corner of the basin and connected to a connecting portion, and a front wall. The back and front walls are disposed respectively to be faced to the corner and to be faced inwardly of the basin when the filtering device is attached. The rising pipe has a cross-sectional configuration such that the back and front walls are connected to form a close section. Suckers are fixedly mounted on the outer surfaces of the mounting portions of the back wall and adapted to be adsorbed onto two surfaces, of the basin, consituating the corners, respectively.

21 Claims, 6 Drawing Sheets

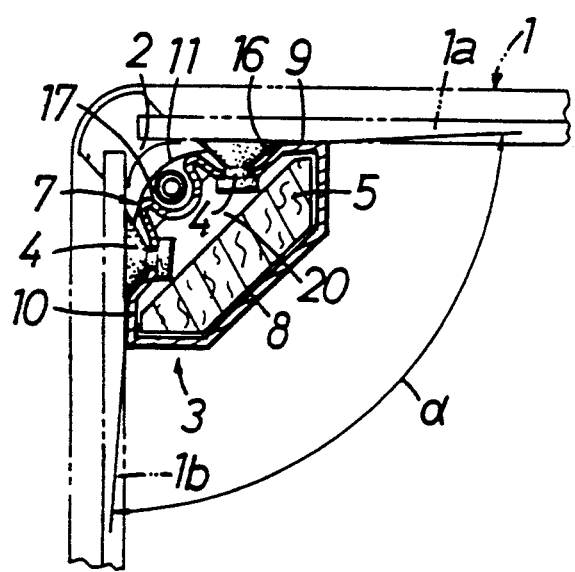
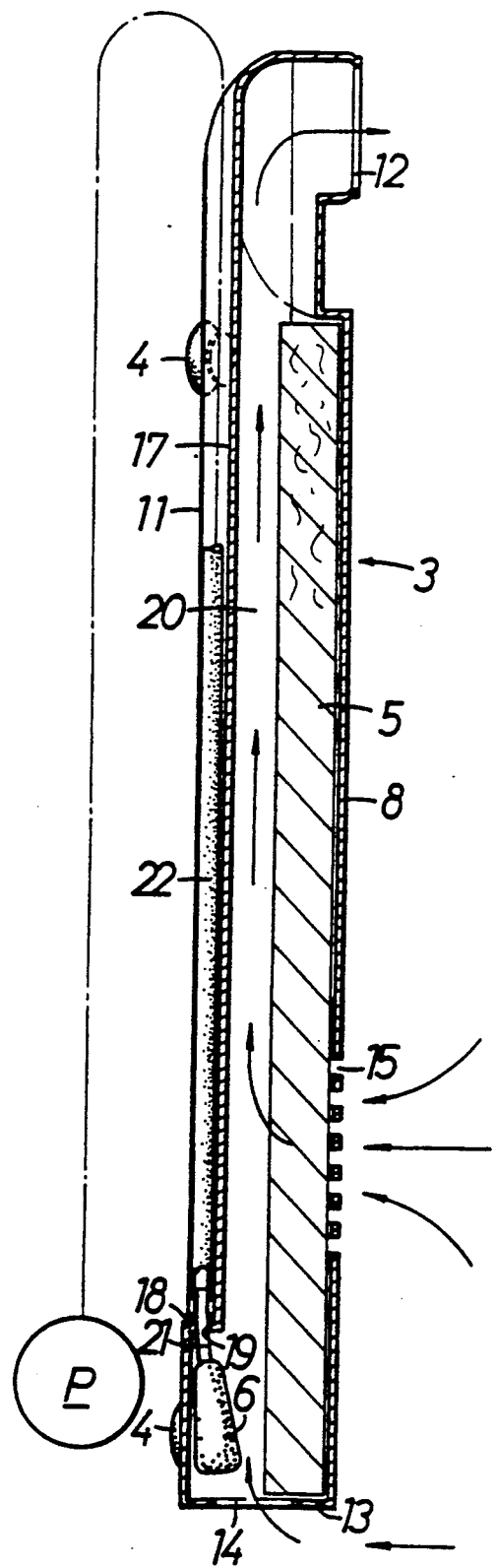

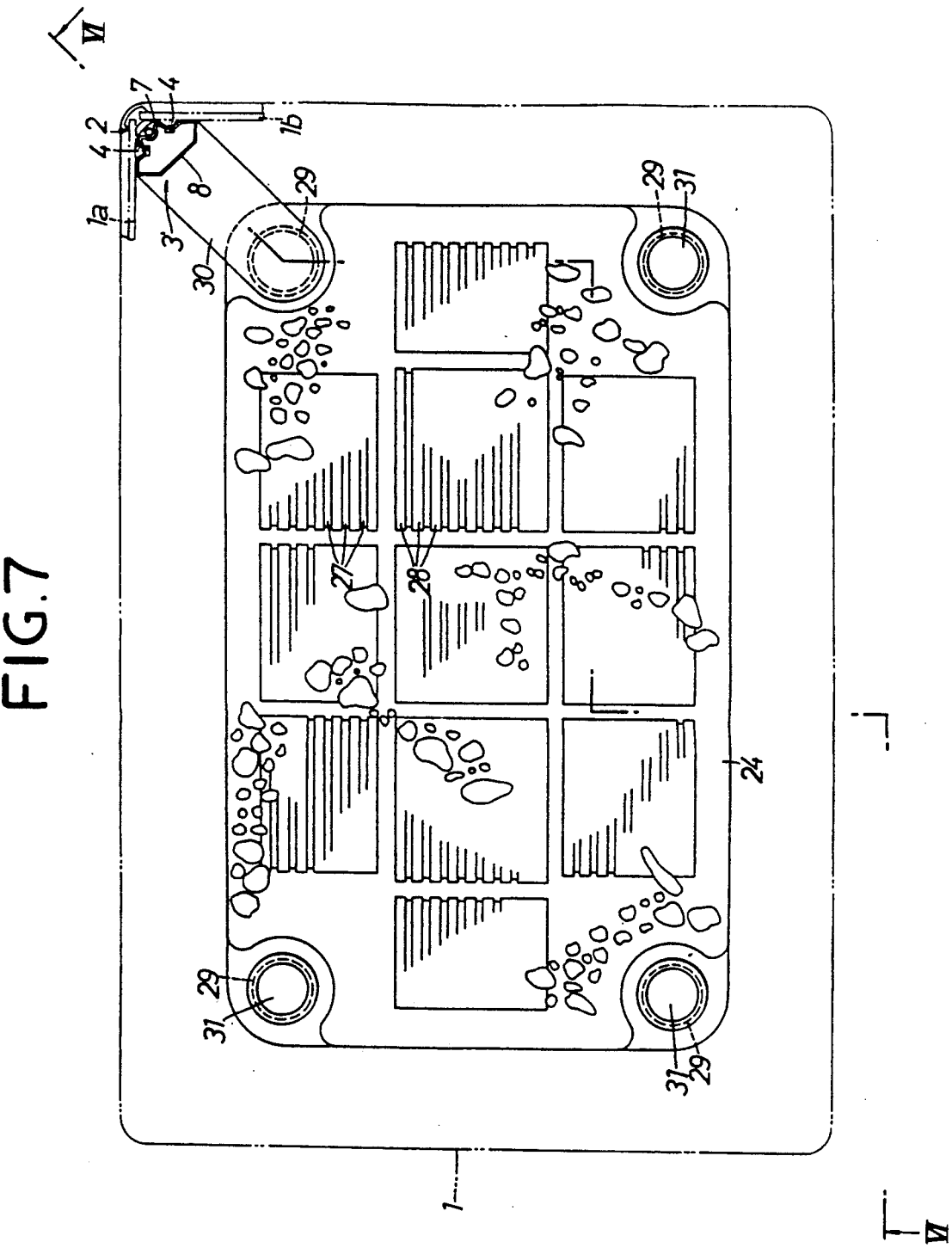

FILTERING DEVICE

This application is a continuation of prior application Ser. No. 535,221, filed June 8, 1990, now abandoned, which was a continuation of now abandoned Ser. No. 131,295, filed Dec. 7, 1987, which was a continuation of now abandoned Ser. No. 897,888, filed Aug. 19, 1986 now abandoned.

BACKGROUND OF THE INVENTION

1. Field of the Invention

The present invention relates to a filtering device comprising a rising pipe basically shaped into a cylinder having a drain port at its upper end and placed within a box-like basin to vertically extend, and a cylinderical porous air injecting member contained within the rising pipe at its lower portion in a connected relationship to a pressurized air source to develop an upward flow of water within the rising pipe.

2. Description of the Prior Art

In such conventional filtering devices, the rising pipe is commonly placed within the basin at a distance spaced from the inner surface of the basin.

However, the exsistence of a space between the rising pipe and the inner surface of the basin may permit aquarium fish cultivated within the basin to enter that space, so that they are sandwiched between a filter case and the inner surface of the basin to become motionless.

SUMMARY OF THE INVENTION

It is therefore an object of the present invention to provide a filtering device wherein a rising pipe can be reliably fixed in close contact with the inner surface of a basin.

According to the present invention, the above object is accomplished by providing a filtering device comprising a rising pipe basically shaped into a cylinder having a drain port at its upper end and placed within a box-like basin to vertically extend, and a porous air injecting member contained within the rising pipe at its lower portion in a connected relationship to a pressurized air source to develop an upward flow of water within the rising pipe, wherein the rising pipe is formed of an elastic material to have a back wall comprised of a pair of mounting portions forming an angle slightly larger than that of the corner of the basin and connected to a connecting portion, and a front wall, the back wall being disposed to be faced to the corner and the front wall being disposed to be faced inwardly of the basin when the filtering device is attached, the rising pipe having a cross-sectional configuration such that the back and front walls are connected to form a close section; and suckers are fixedly mounted on the outer surfaces of the mounting portions of the back wall and adapted to be adsorbed onto two surfaces of the basin consituting the corners, respectively.

With such arrangement, upon pressing the rising pipe onto the corner of the basin with the back wall thereof faced to the corner, the ends edges of the both mounting portions close to the front wall abut against the two side surfaces of the basin and the suckers are adsorbed onto the two side surfaces. Moreover, since the rising pipe is made of an elastic material, the both mounting portions are intended to move away from the two side surfaces of the basin, whereby the suckers fulfil a larger adsorptive force, thus ensuring that the rising pipe is reliably fixed to the basin in close contact with the inner surface of the basin.

It is another object of the present invention to provide a filtering device wherein a filtering action is provided within the rising pipe.

It is a still further object of the present invention to provide a filtering device wherein the water filtered through a gravel spreaded all over the bottom of a basin is raised in a rising pipe placed in close contact with the inner side surfaces of the basin.

The above and other objects, features and advantages of the invention will become apparent from reading of the following description taken in conjunction with the accompanying drawings.

BRIEF DESCRIPTION OF THE DRAWINGS

FIGS. 1 to 4 illustrate one embodiment of the present invention, wherein FIG. 1 is a perspective view of the whole of a filtering-device attached to a basin;

FIG. 2 is an enlarged front view of a rising pipe;

FIG. 3 is a side view of the rising pipe in vertical section on an enlarged scale; and FIG. 4 is an enlarged sectional view taken along the line IV—IV of FIG. 1; and FIGS. 5 to 7 illustrate another embodiment of the present invention, wherein FIG. 5 a perspective view of the whole of a filtering device attached to a basin;

FIG. 6 is a vertical sectional view taken along the line VI—VI of FIG. 7 on an enlarged scale; and FIG. 7 is a sectional view taken along the line VII—VII of FIG. 6.

DESCRIPTION OF THE PREFERRED EMBODIMENTS

The present invention will now be described by way of embodiments with reference to the accompanying drawings.

Figure 1:
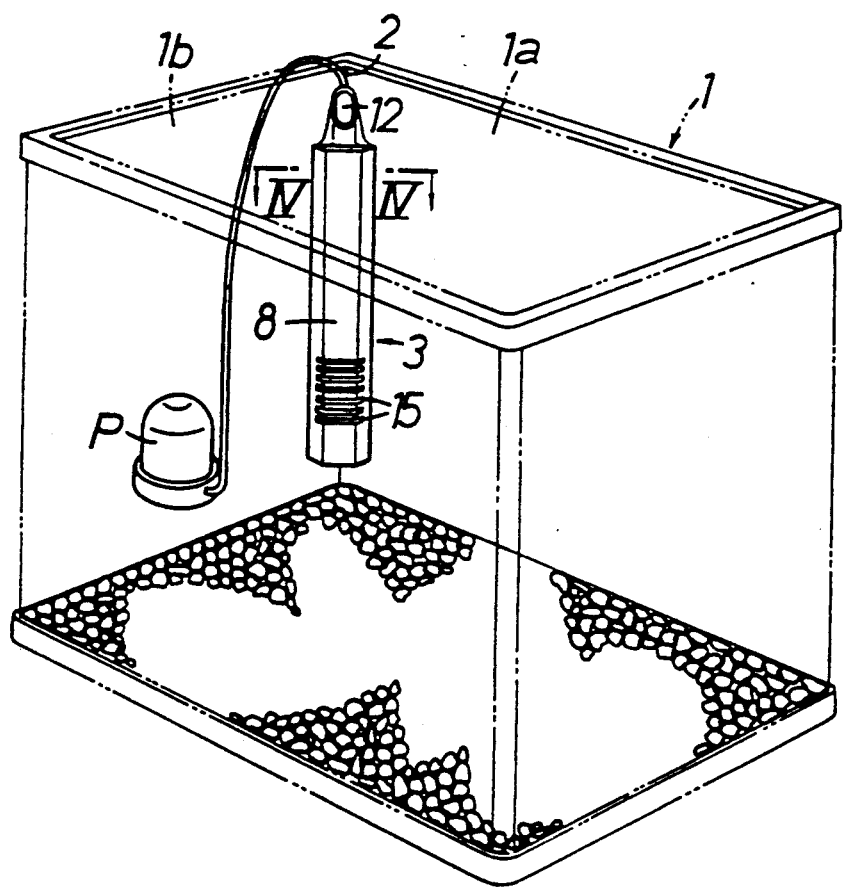

Referring first to FIG. 1 illustrating one embodiment of the present invention, there is shown a basin 1 shaped into a box-like configuration for cultivating aquarium fish such as goldfish, tropical fish and saltwater fish. A rising pipe 3 of a filtering device to the present invention is attached to a corner 2 formed by two side surfaces 1a and 1b, intersecting at a right angle, of the basin 1. A pressurized air is supplied from an air pump P as a pressurized air source placed outside the basin 1 into the rising pipe 3, thereby producing a rising flow of water in the rising pipe 3, so that water drawn into the rising pipe 3 out of the water basin 1 is filtered and then returned into the basin 1.

Figure 2:
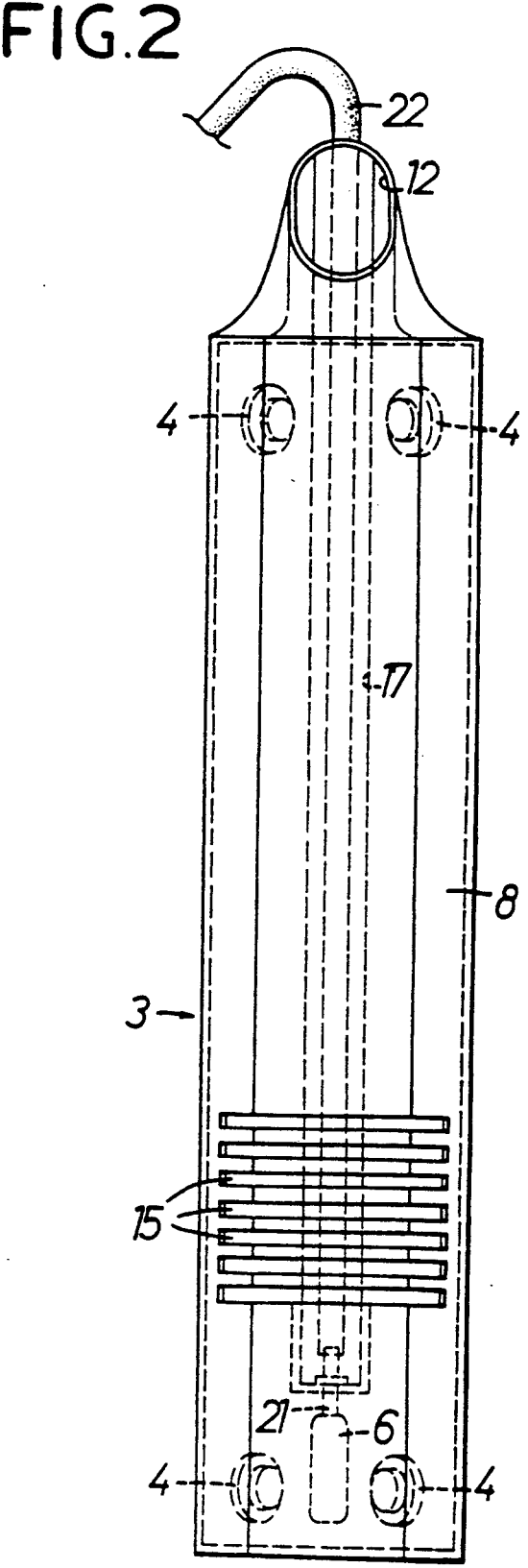

Referring also to FIGS. 2, 3 and 4, the filtering device comprises the rising pipe 3, a plurality of suckers 4, filtering elements 5 and a porous air injecting member 6.

The rising pipe 3 is basically formed of a elastic material such as a synthetic resin into a bottomed cylinder having such a cross-sectional configuration that a back wall 7 disposed to be faced to the corner 2 and a front wall 8 disposed to be faced inwardly of the water basin 1 in the attached state are interconnected to form a closed section.

The back wall 7 is constituted of a pair of mounting portions 9 and 10 connected by a connecting portion 11. The mounting portions 9 and 10 are disposed with an angle formed by both of them being slightly larger than the angle formed by the side surfaces 1a and 1b of the water basin 1, i.e., 90 degrees, and the connecting portion 11 is shaped into a circular arc curved to be convex toward the corner 2. On the other hand, the front wall 8 is shaped into a trapezoid converging inwardly of the water basin 1.

A drain port 12 is provided in the upper end of the rising pipe 3 and opened inwardly of the water basin 1, and an auxiliary water suction port 14 is bored in the bottom wall 13 of the rising pipe 3. In addition, a plurality of slit-like water suction ports 15 are made at vertically spaced distances in the lower portion of the front wall 8 of the rising pipe 3.

On the other hand, in the back wall 7 of the rising pipe 3, a pair of recesses 16 are provided at a vertically spaced distance in the outer surfaces of the both mounting portions 9 and 10, and a containing groove 17 is provided in the connecting portion 11. Moreover, the containing groove 17 is disposed to vertically extend from the upper end to the vicinity of the bottom of the rising pipe 3 and has an upper end opened upwardly and a lower end in which an upwardly facing end wall 18 is mounted. A hole 19 is perforated in the end wall 18 to lead to the inside of the rising pipe 3.

The suckers 4 are fixedly mounted in the individual recesses 16 in the both mounting portions 9 and 10, respectively, with the base portions of the suckers 4 being engaged with the mounting portions 9 and 10 moreover, with the fore end of the individual sucker 4 projecting outwardly from the outer surfaces of the mounting portions 9 and 10.

The filtering elements 5 are each shaped into a column having a cross-sectional configuration substantially corresponding to the cross-sectional configuration of the front wall 8 and are arranged within the rising pipe 3 in a manner to be offset toward the front wall 8. A conduit 20 is thus defined between the back wall 7 and the filtering elements 5 within the rising pipe 3 over the entire length of the rising pipe 3, with the upper end thereof connected to the drain port 12 and the lower end thereof connected to the auxiliary suction port 14.

The porous air injecting member 6 is formed of a gas-permeable material such as an expandable synthetic resin and disposed at the lower portion in the conduit 20 so that a smaller diameter connecting pipe 21 integral with the porous air injecting member 6 may be protruded from the hole 19 into the containing groove 17.

A hose 22 is connected at one end thereof to the air pump P outside the basin 1. The hose 22 is introduced through the upper end of the rising pipe 3 into the containing groove 17 to extend downwardly within the containing groove and is connected to the connecting pipe 21 of the porous air injecting member 6.

Description will now be made of the operating of this embodiment. In attaching the rising pipe 3 to the basin 1, the rising pipe 3 is pressed onto the corner 2 in the state of the back wall 7 being faced to the corner 2 with the drain port 12 corresponding to the water level within the basin 1. This causes the ends close to the front wall 8, of the both mounting portions 9 and 10 of the back wall 7 to abut against the corresponding side surfaces 1a and 1b of the basin 1. As the rising pipe 3 is further pressed in a manner to allow the mounting portions 9 and 10 to be deflected, the individual suckers 4 are forced onto the both side surfaces 1a and 1b. Thereupon, if the hand is released from the rising pipe 3, then the individual mounting portions 9 and 10 are intended to move away from the side surfaces 1a and 1b by the action of the resiliency thereof, so that the closed space between each sucker 4 and each of the side surfaces 1a and 1b is depressurized to increase the adsorptive force of each sucker 4, thus ensuring that the rising pipe 3 is securely attached to the basin 1.

In such attached state, those end edges of the both mounting portions 9 and 10 in the back wall 7 which are close to the front wall 8 are in close contact with the corresponding side surfaces 1a and 1b of the basin 1, so that any aquarium fish is reliably prevented from entering between the rising pipe 3 and the inner surface of the basin 1. Moreover, since the hose 22 is contained in the containing groove 17 provided in the back wall 7, it is possible to place the back wall 7 in closer vicinity to the corner 2, i.e., to reduce the space between the corner 2 and the back wall 7, which also prevents any aquarium fish from entering between the rising pipe 3 and the inner surface of the basin 1.

When a pressurized air is supplied from the air pump P into the porous air injecting member 6 in the state of the rising pipe 3 attached to the basin 1, air bubbles produced in the porous air injecting member 6 raise in the conduit 20 to produce a raising flow of water in the conduit 20. The raising flow of water is formed by water penetrating the filtering elements through the suction port 15 to enter the conduit 20 and water entering the conduit 20 through the auxiliary suction port 14. The water entering the conduit 20 through the suction port 15 penetrates the filtering elements 5 at a proper rate, so that it is purified to flow back into the basin 1. More particularly, the provision of the auxiliary suction port 14 permits the rate of the water penetrating the filtering elements 5 to be controlled at a value suitable to accelerate the propagation of chlorella and aerobic microbes, so that the organic substances such as leftover bait and dung of aquarium fish can be decomposed by the aerobic microbes to prevent the clogging the filtering elements 5, and the chlorella can be provided as fresh bait for the aquarium fish.

Figure 5:
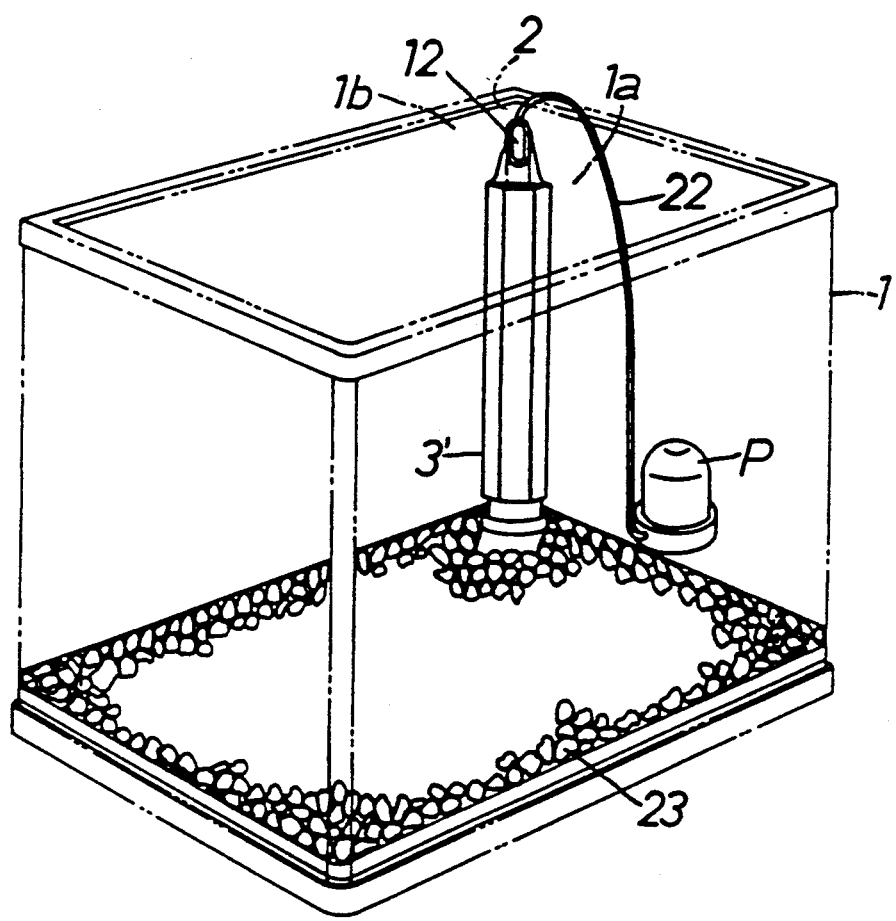
Figure 6:
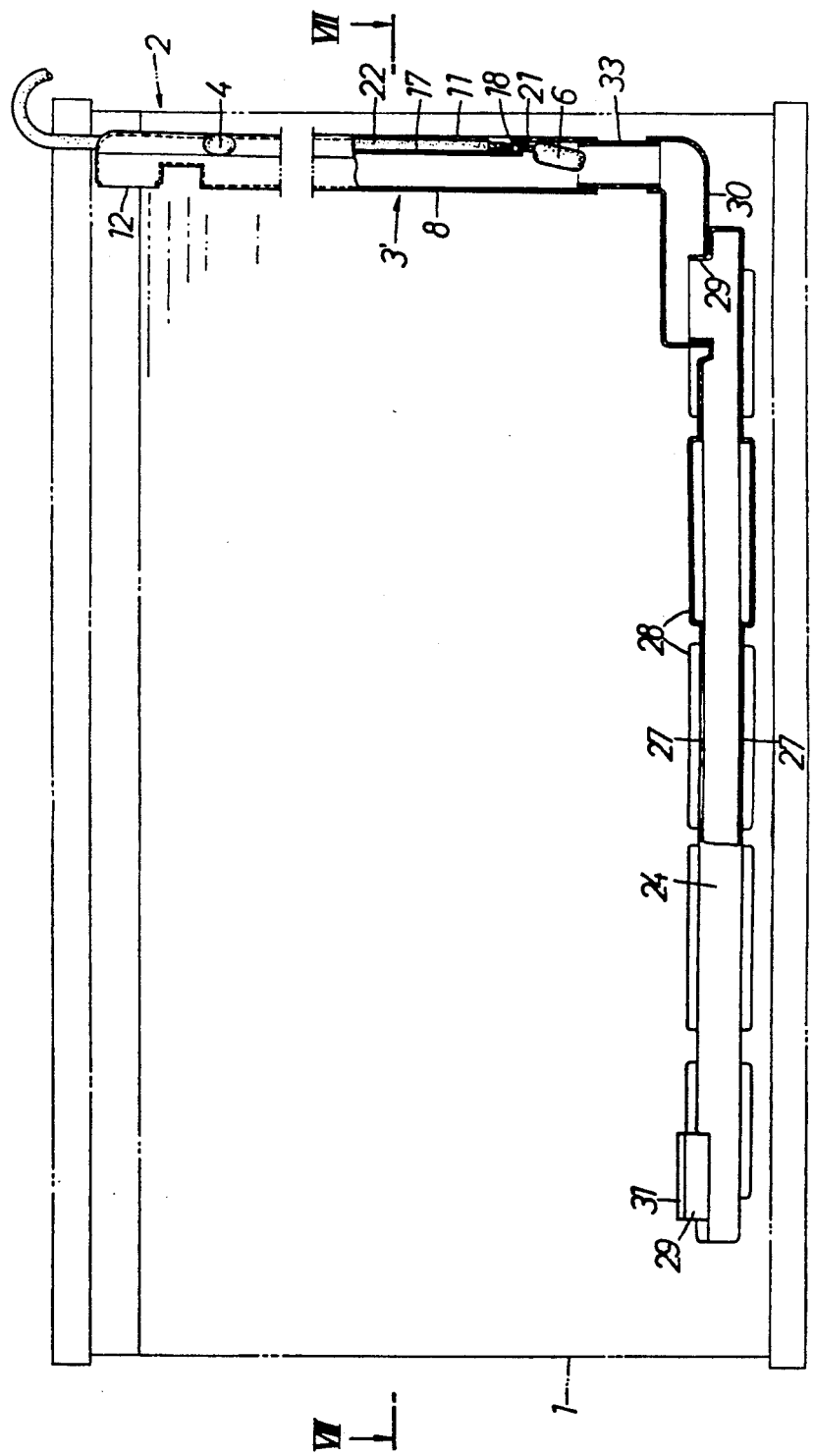

FIGS. 5 to 7 illustrate another embodiment of the present invention, wherein the parts corresponding to those in the previously described embodiment are designated by the same reference characters as in the previous embodiment.

A gravel 23 is spreaded within the basin 1 all over the bottom thereof to provide a bottom type filtering device which utilizes the gravel 23 as a filtering medium to filter water.

The bottom type filtering device comprises a casing 24 placed on the bottom of the basin 1 with at least a part (the whole in this embodiment) buried in the gravel 23, a rising pipe 3' extending in communication with the casing 24 and opened at its upper portion, and a porous air injecting member 6 disposed within the rising pipe 3' at its lower portion.

The casing 24 is shaped into a flat rectangular box and has a number of slit-like water suction ports 27 perforated respectively in the upper and lower opposite surfaces thereof. Each of the suction ports 27 is provided between adjacent ones of a plurality of parallel protrusions 28, whereby each suction port 27 may be prevented from being clogged with the gravel 23.

A short cylinder-like connecting pipe portion 29 is integrally mounted in a projecting manner on the upper surface of the casing 24 at each of the four corners of the casing 24. A communication pipe 30 is fitted and connected to one of the four connecting pipe portions 29, and the remaining connecting pipe portions 29 are each plugged with a cap 31.

The rising pipe 3' has a configuration corresponding to that of the rising pipe 3 of the previous embodiment being opened at its lower end, and is permited to communicate with the inside of the casing 24 by connecting a second communication pipe 33 fitted and connected to the lower portion of the rising pipe 3' with the first communication pipe 30. No filtering element is contained in the rising pipe 3'.

The following is the description of the operation of this embodiment. In placing the bottom type filtering device, the casing 24 connected with the rising pipe 3' is placed onto the bottom of the basin 1, and with the back wall 7 faced to the corner 2, the rising pipe 3' is pressed onto the corner 2. This enables the rising pipe 3' to be fixedly mounted on the corner 2 in close contact with the side surfaces 1a and 1b as in the previous embodiment.

After the completion of placing the bottom type filtering device, a pressurized air is supplied from the air pump P into the porous air injecting member 6, so that air bubbles produced in the porous air injecting member 6 raise within the rising pipe 3' to produce a raising flow of water in the rising pipe 3'. Consequently, a flow of water toward the rising pipe 3' is produced also in the casing 24 communicating with the rising pipe 3', so that water within the basin 1 is passed through the gravel 23 and filtered. Then, the filtered water enters the casing 24 through the suction port 27 and raises within the rising pipe 3' to flow back into the basin 1.

The inside of the casing 24 has been a mere space in the above embodiment, but it should be understood that a filtering medium may be filled in the casing 24.

What is claimed is:

1. A device for promoting generation of a water flow in a box-like basin having a 90° angled corner, the device in combination with the basin comprising:
   a vertically extending pipe having an air injecting member within said pipe, said air injecting member being connected to a pressurized air source wherein said pipe is mounted to the 90° angled corner of the basin, said pipe having
   a back wall facing the corner, and
   a front wall which is connected to the back wall via end edges, the front wall and the back wall forming a closed cross-section surrounding said pipe; and
   mounting means for mounting said pipe to the angled corner, said mounting means being incoporated in the back wall which includes a pair of mouunting portions cooperatively defining an angle slightly larger than 90°, a connecting portion between the pair of mounting portions, and suckers being fixedly mounted on respective outer surfaces of the mounting portions, said suckers being absorbed, in an assembled state of the pipe, onto two inner surfaces of said basin defining the 90° angled corner whereby said mounting means urges end edges of the mounting portions between said front and back walls into linear contact with said two inner surfaces of the basin.

2. A device according to claim 1, wherein the pipe has a drain port opened at an upper portion thereof and an inlet opened at a lower portion thereof and defines a conduit extending over substantially the entire length thereof between said drain port and said inlet.

3. A device according to claim 2, wherein said pipe is formed as a bottomed container and a waste suction port is provided at its front wall as said inlet.

4. A device according to claim 3, wherein a filtering element is housed within said pipe at a position offset from the back wall toward the front wall to define said conduit between the filtering element and the back wall.

5. A device according to claim 3 or 4, wherein an auxiliary water suction port is perforated at the bottom of the pipe in communication with said conduit.

6. A device according to claim 2, wherein a flat casing is placed on the bottom of the basin in a state at least partially buried in gravel spread over the basin bottom, said flat casing having a plurality of water suction ports to one of which ports is selectively connected said inlet of the pipe.

7. A device according to claim 6, wherein the inlet of the pipe and the selected one water suction port are connected together via communication pipe means.

8. A device according to claim 2, 3, or 6, wherein said air injecting member is disposed at a lower portion of the pipe.

9. A device according to claim 8, wherein a containing groove is recessed in the outer surface of said connecting portion of the back wall and extends from an upper portion to a lower portion of said pipe and a hose interconnecting said air injecting member and said pressurized air source is contained in said groove, a hole being perforated in the pipe at a lower end of the groove for providing connection between said hose and said air injecting member.

10. A device according to claim 1, wherein said pipe is formed of an elastic material.

11. A device for promoting generation of a water flow in a aquarium having a 90° angled corner, the device in combination with the aquarium comprising:
   a pipe provided with an outlet opening, an inlet opening and a conduit between the inlet and outlet openings, said pipe being mounted to the angled corner at an upstanding posture in use;
   an air injecting member in the pipe member connected to a pressurized air source, wherein said pipe includes a front wall facing the interior of the aquarium and a back wall facing the angled corner, said front and back walls being connected together via end edges; and
   mounting means for mounting said pipe to the 90° angled corner of the aquarium, said mounting means being incorporated in said back wall which has a pair of mounting surfaces portions which cooperatively define an angle slightly larger than 90°, and suckers being provided on the respective mounting surface portions and being adapted to be absorbed in use to respective inner surfaces of the aquarium forming the angled corner, whereby
   when said pipe is mounted to the 90° angled corner of the aquarium by means of the suckers, said mounting means places the end edges of the pipe in linear abutment against the inner surfaces of the aquarium.

12. A device according to claim 1 or 11, wherein said suckers consist of a pair of suckers disposed to an upper portion of the back wall and a pair of suckers at a lower portion thereof.

13. A device according to claim 11, wherein a filtering material is disposed in said pipe so as to be interposed between said inlet opening and said outlet opening.

14. A device for promoting generation of a water flow in combination with a basin having an angled corner, the device comprising:
   a vertically extending pipe which includes a back wall facing the angled corner of the basin and a front wall facing an interior of the basin and connected to said back wall via end edges so as top form a closed cross-section with said back wall, said pipe further having an inlet opening, an outlet opening and a conduit between the inlet and outlet openings, wherein said back wall includes a pair of mounting portions which cooperatively define an angle therebetween slightly larger than an angle of the angled corner, suction means provided on the respective mounting portions and being absorbed, in an assembled state of the pipe with said basin, onto two inner surfaces of the basin defining the angled corner while urging said end edges into abutment against the inner surfaces of the basin.

15. A device according to claim 14, wherein the suction means includes a plurality of suckers mounted to the pair of mounting portions of the back wall.

16. A device according to claim 15, wherein the suckers are fixedly mounted in recesses provided in each of the pair of mounting portions so as to project at respective fore ends thereof outwardly from outer surfaces of the pair of mounting portions.

17. A device according to claim 14, wherein the angled corner of the basin has an angle of 90° and the pair of mounting portions of the pipe define an angle slightly larger than 90°.

18. A device according to claim 14, wherein said pipe includes a connecting portion between the pair of mounting portions and a vertically extending groove provided in said connecting portion for receiving therein a hose member which interconnects an air injecting member disposed inside said pipe and a pressurized air source outside said pipe.

19. A device according to claim 14, wherein the inlet opening is perforated at a lower portion of said pipe and the outlet opening is perforated at an upper portion of said pipe.

20. A device according to claim 19, further comprising:

a flat casting placed on a bottom of the basin so as to be at least partially buried in gravel spread over the bottom, said flat casing being provided with a plurality of water suction ports and having an interior thereof connected to the inlet opening of said pipe.

21. A device according to claim 14, wherein a filtering material is disposed in the pipe so as to let water flowing from the inlet opening toward the outlet opening to pass through said filtering material.

* * * * *